US007675195B2

(12) United States Patent
Mierta

(10) Patent No.: US 7,675,195 B2
(45) Date of Patent: Mar. 9, 2010

(54) LOAD CONTROL SYSTEM HAVING A PLURALITY OF REPEATER DEVICES

(75) Inventor: Justin Mierta, Allentown, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 274 days.

(21) Appl. No.: 12/001,407

(22) Filed: Dec. 11, 2007

(65) Prior Publication Data

US 2008/0136261 A1 Jun. 12, 2008

Related U.S. Application Data

(60) Provisional application No. 60/874,166, filed on Dec. 11, 2006.

(51) Int. Cl.
*H02J 3/00* (2006.01)

(52) U.S. Cl. ................................ 307/40; 307/3; 307/18; 307/29

(58) Field of Classification Search ................. 307/1–8, 307/18–19, 38–41; 340/310.11–310.18
See application file for complete search history.

(56) References Cited

U.S. PATENT DOCUMENTS

| | | | |
|---|---|---|---|
| 5,848,054 | A | 12/1998 | Mosebrook et al. |
| 6,188,181 | B1 | 2/2001 | Sinha et al. |
| 6,687,487 | B1 | 2/2004 | Mosebrook et al. |
| 6,803,728 | B2 | 10/2004 | Balasubramaniam et al. |
| 6,983,783 | B2 | 1/2006 | Carmen, Jr. et al. |
| 7,085,627 | B2 | 8/2006 | Bamberger et al. |
| 7,369,060 | B2 | 5/2008 | Veskovic et al. |
| 2005/0179404 | A1 | 8/2005 | Veskovic et al. |
| 2006/0028212 | A1 | 2/2006 | Steiner et al. |
| 2006/0125426 | A1 | 6/2006 | Veskovic et al. |
| 2006/0202851 | A1 | 9/2006 | Cash et al. |
| 2008/0088180 | A1 | 4/2008 | Cash et al. |
| 2008/0092075 | A1 | 4/2008 | Jacob et al. |
| 2008/0136261 | A1 * | 6/2008 | Mierta ......................... 307/40 |
| 2008/0258551 | A1 * | 10/2008 | Chitta et al. ................... 307/3 |

FOREIGN PATENT DOCUMENTS

JP 2001-197141 * 7/2001

OTHER PUBLICATIONS

Machine Translation for JP2001-197141.*

Lutron Electronics Co., Inc., Grafik 6000 Processor Panel Specification Submittal Sheet, Apr. 15, 2002, 5 pages.

(Continued)

*Primary Examiner*—Fritz M Fleming
(74) *Attorney, Agent, or Firm*—Mark E. Rose; Philip N. Smith

(57) ABSTRACT

A load control system comprises a plurality of control devices, each coupled to one of a plurality of device communication links. The device communication links are each coupled to a one of a plurality of link power supplies, which provides power for the control devices on the device communication links. The link power supplies are coupled together via a repeater communication link and operate as repeater devices to retransmit digital messages received from the device communication link onto the repeater communication link, and vice versa. The retransmitted digital messages are substantially the same as the received digital messages. No control devices are coupled to the repeater communication link, such that no control devices draw current through the repeater communication link. A maximum of only two or three link power supplies are coupled between any two control devices of the load control system.

16 Claims, 6 Drawing Sheets

OTHER PUBLICATIONS

Lutron Electronics Co., Inc., Grafik 6000 MX-RPTR Link Booster Installation Instructions Sheet, Aug. 1998, 6 pages.

Lutron Electronics Co., Inc., LUT-LINK-EXT Link Extender Installation Instructions Sheet, Jul. 2000, 4 pages.

Lutron Electronics Co., Inc., Homeworks Hybrid Repeater Installation Instructions Sheet, May 2005, 4 pages.

Lutron Electronics Co., Inc., Sivoia QED SVQ-10-PNL Power Panel Installation Instructions Sheet, Jun. 2003, 6 pages.

U.S. Appl. No. 11/938,039, filed Nov. 9, 2007, Abraham et al.

* cited by examiner

LOAD CONTROL SYSTEM HAVING A PLURALITY OF REPEATER DEVICES

RELATED APPLICATIONS

This application claims priority from commonly-assigned U.S. Provisional Application Ser. No. 60/874,166, filed Dec. 11, 2006, entitled LOAD CONTROL SYSTEM HAVING A PLURALITY OF REPEATER DEVICES, the entire disclosure of which hereby incorporated by reference.

BACKGROUND OF THE INVENTION

1. Field of the Invention

The present invention relates to a load control system comprising a plurality of load control devices for controlling the amount of power delivered to a plurality of electrical loads from an AC power source, and more particularly, to a lighting control system for controlling the intensity of a plurality of lighting loads.

2. Description of the Related Art

Typical load control systems are operable to control the amount of power delivered to an electrical load, such as a lighting load or a motor load, from an alternating-current (AC) power source. A load control system generally comprises a plurality of control devices coupled to a communication link to allow for communication between the control devices. The control devices of a lighting control system include load control devices operable to control the amount of power delivered to the loads in response to digital messages received across the communication link or local inputs, such as user actuations of a button. Further, the control devices of a lighting control system often include one or more keypad controllers that transmit commands across the communication link in order to control the loads coupled to the load control devices. An example of a lighting control system is described in greater detail in commonly-assigned U.S. Pat. No. 6,803,728, issued Oct. 12, 2004, entitled SYSTEM FOR CONTROL OF DEVICES, which is incorporated herein by reference in its entirety.

FIG. 1 is a simplified block diagram of a prior art lighting control system 10 according to the present invention. The lighting control system comprises a power panel 12 having a plurality of load control modules (LCMs) 14 (i.e., load control devices). Each load control module 14 is coupled to a lighting load 16 (or another type of electrical load, such as a motor load) for control of the amount of power delivered to the lighting load. Alternatively, each load control module 14 may be coupled to more than one lighting load 16, for example, four lighting loads, for individual control of the amount of power delivered to each of the lighting loads. The power panel 12 also comprises a module interface (MI) 18, which controls the operation of the load control modules 14 via digital signals transmitted across a power module control link 20

The lighting control system 10 further comprises a processor 22, which controls the operation of the lighting control system and thus the amount of power delivered to the lighting loads 16 by the load control modules 14. The processor 22 is operable to communicate with the module interface 18 of the power panel 12 via a power panel link 24. Accordingly, the module interface 18 is operable to cause the load control modules 14 to turn off and on and to control the intensity of the lighting loads 16 in response to digital messages received from the processor 22. The processor 22 is operable to be coupled to a plurality of power panels (not shown) via the power panel link 24.

In addition to being coupled to the power panel link 24, the central processor 22 is also coupled to a control device communication link 26 for communication with a plurality of control devices 28 (e.g., wallstations or keypads). The control devices 28 allow users to provide inputs to the lighting control system 10. The processor 22 is operable to control the lighting loads 16 in response to digital messages received from the control devices 28.

The control devices 28 of the control device communication link 26 communicate using a high baud rate, e.g., 125 kilobits per second (kbps), and are wired together using a daisy-chain wiring scheme. Using the daisy-chain wiring scheme, the control devices are wired in series, e.g., a first control device is wired to a-second control device, which is wired to a third control device, which is wired to a fourth control device, and so on. The control devices cannot be wired using a web, star, or "free-wiring" topology. Since the control device communication link 26 uses a high baud rate of 125 kbps and a daisy-chain wiring scheme, the length of the link is limited to approximately 2000 feet.

The length of the control device communication link 26 may be effectively lengthened by using a plurality of repeater devices 30. The plurality of repeater devices are coupled between different sections of the control device communication link 26, which are each limited to 2000 feet. Each repeater device 30 receives the AC line voltage and supplies power for the control devices on one of the sections of the control device communication link 26. The repeater devices 30 are operable to retransmit the digital messages that are received on one section of the control device communication link 26 on the other section of the link to which the repeater devices are connected.

The use of the repeater devices 30 introduces some delay into the transmissions of the control device communication link 26. When a repeater device 30 retransmits a digital message, there is a delay period from when the repeater device 30 receives the digital message to when the repeater device transmits the digital message on the other section of the control device communication link 26. Further, depending upon the data content of the digital message, the repeater device 30 may be enabled to transmit on the control device communication link 26 for a period of time after the end of the digital message that the repeater device. Thus, there is a period of time after the repeater device transmits a digital message that the repeater device 30 maintains control over the communication link 26 and the other control devices cannot transmit digital messages.

Accordingly, a predetermined delay period must be built into the protocol of the control device communication link in order to account for the delays of the repeater devices 30. Specifically, each control device must wait for a predetermined amount of time after the end of the last digital message before transmitting a digital message on the communication link. The predetermined delay period is dependent upon the number of repeater devices 30 that can be included in the lighting control system 10. The predetermined delay period decreases the response time of the lighting control system 10.

Thus, there is a need for a load control system that can include a plurality of repeater devices, but still has a substantially fast response time.

SUMMARY OF THE INVENTION

According to the present invention, a load control system for controlling the amount of power delivered to a plurality of electrical loads from an AC power source comprises a plurality of link power supply devices, a plurality of device communication links, a plurality of control devices, and a repeater communication link. Each link power supply device includes first and second communication ports, and an internal power supply for receiving a supply voltage and for generating a link voltage. Each of the device communication links is coupled to the first communication port of one of the plurality of link power supply devices. Each of the control devices is coupled to one of the plurality of device communication links. The link voltages of the link power supplies are provided on the device communication links, such that the control devices are operable to draw current from the link power supply devices. The control devices are operable to transmit and receive first digital messages between each other via the device communication links. The repeater communication link is coupled to the second communication port of each of the link power supply devices. The link power supply devices are each operable to receive the first digital messages via the first communication port and to subsequently transmit second digital messages on the repeater communication link via the second communication port. The second digital messages are substantially the same as the first digital messages. No control devices are coupled to the repeater communication link, such that no control devices draw current through the repeater communication link.

The present invention further provides a link power supply device for a load control system for controlling the amount of power delivered to a plurality of electrical loads from an AC power source. The link power supply device comprise first and second communication ports, first and second communication circuits, and a power supply. The first communication port is adapted to be coupled to a device communication link for receipt of a first digital message, while the second communication port is adapted to be coupled to a repeater communication. The first and second communication circuits are coupled to the first and second communication ports, respectively, and are operatively coupled together, such that the second communication circuit is operable to transmit a second digital message on the repeater communication link after the first communication circuit receives the first digital message. The power supply is operable to receive a supply voltage and to generate a link voltage, which is provided to the first communication port, but not provided to the second communication port.

Other features and advantages of the present invention will become apparent from the following description of the invention that refers to the accompanying drawings.

DETAILED DESCRIPTION OF THE INVENTION

Figure 1:
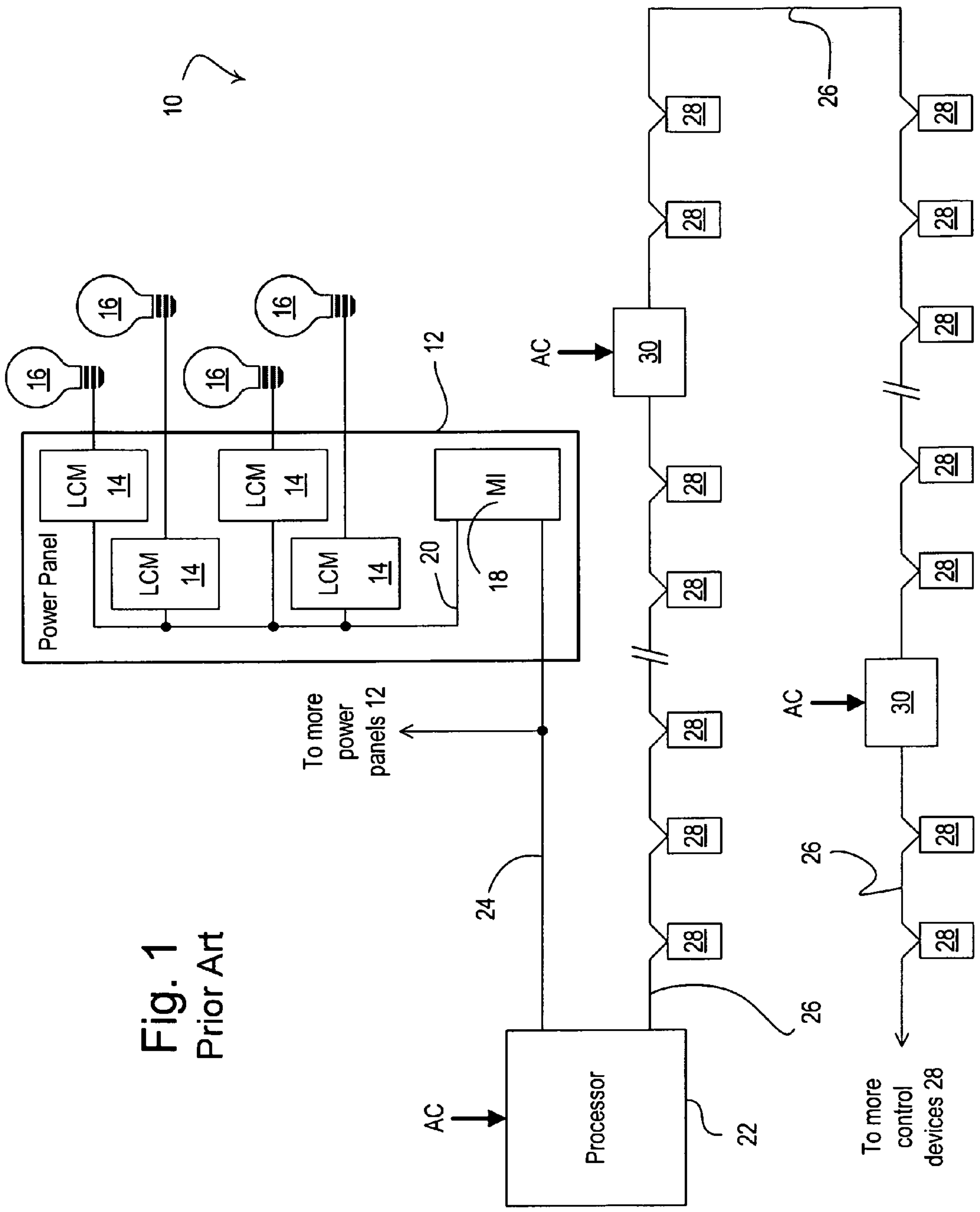
Fig. 1 Prior Art
FIG. 1 is a simplified block diagram of a prior art lighting control system.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 2:
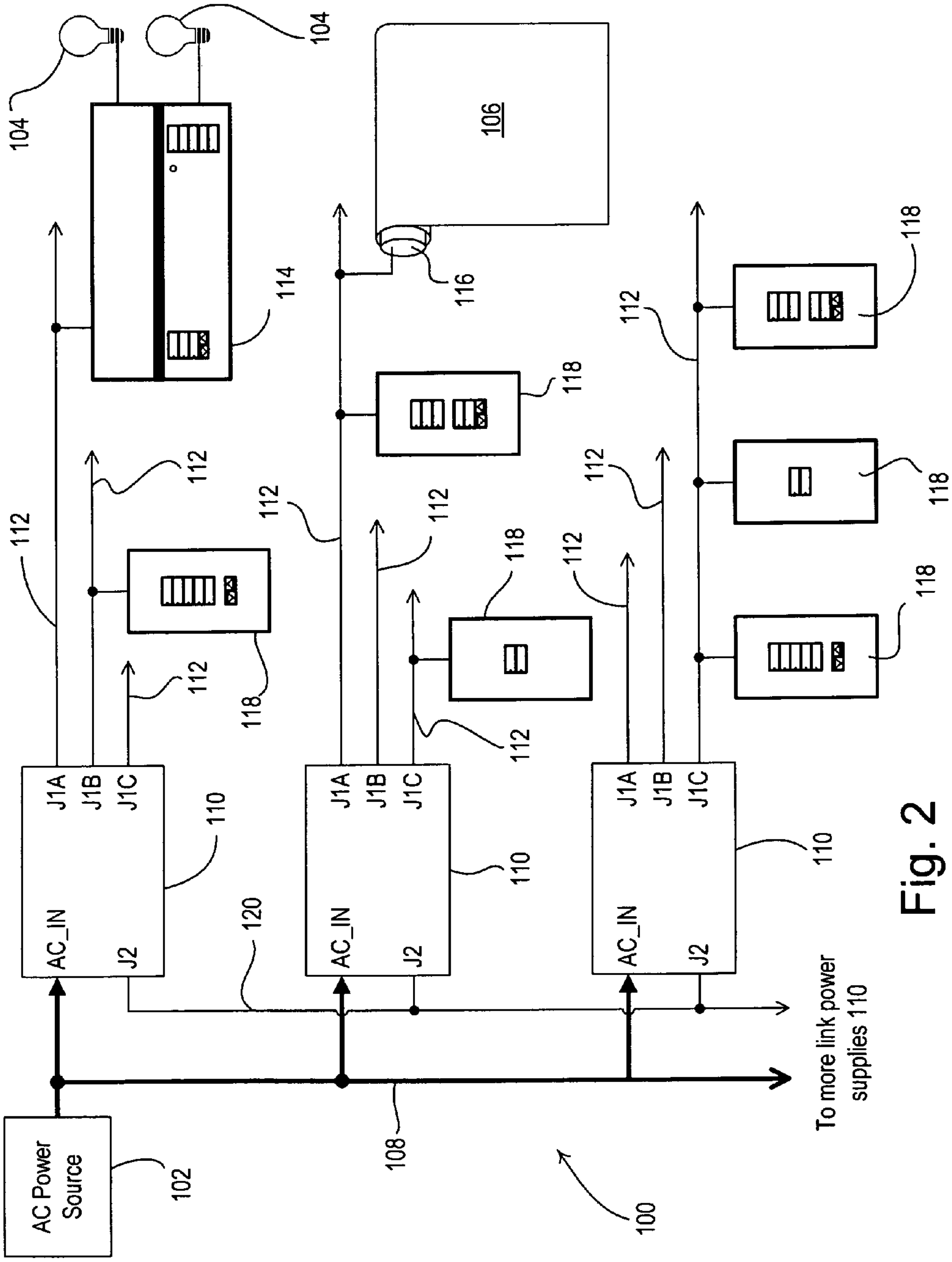
FIG. 2 is a simplified block diagram of a load control system according to a first embodiment of the present invention.

FIG. 2 is a simplified block diagram of a load control system 100 for control of a plurality of lighting loads 104 and a plurality of motorized window treatments, e.g., motorized roller shades 106, from an AC power source 102. The load control system 100 comprises a plurality of link power supplies 110 according to the present invention. Each of the link power supplies 110 is operable to be coupled to a plurality of device communication links 112 (for example, three communication links) via three communication ports, e.g., device communication link connectors J1A, J1B, J1C. The device communication links 112 preferably comprise wired four-wire RS-485 communication links, which each comprise a first wire for a common connection, a second wire for providing a direct-current (DC) link voltage $V_{LINK}$ to power the control devices on the device communication link, and third and fourth wires (i.e., data wires) for carrying digital messages between the control devices. The third and fourth wires carry differential communication signals, i.e., MUX and $\overline{\text{MUX}}$ signals, according to the RS-485 protocol. The third and fourth wires are referenced to the first wire, i.e., the common connection.

A plurality of control devices, e.g., a multi-zone lighting control unit 114, an electronic drive unit 116, and a plurality of keypads 118, are coupled to each of the device communication links 112. The load control system 100 may include more control devices coupled to each of the device communication links 112 than shown in FIG. 2. The lighting control unit 114 comprises integral dimmer circuits for controlling the intensities of the lighting loads 104. Each of the motorized roller shades 106 comprises an electronic drive unit (EDU) 116, which is preferably located inside the roller tube of the roller shade. An example of an electronic drive unit 116 is described in greater detail in commonly-assigned U.S. Pat. No. 6,983,783, issued Jun. 11, 2006, entitled MOTORIZED SHADE CONTROL SYSTEM, the entire disclosure of which is hereby incorporated by reference.

The link power supplies 110 each receive power from the AC power source 102 (via an AC wiring 108 coupled to a connector AC_IN). Each link power supply 110 generates the DC voltages to power the control devices on each of the connected communication links 112. The link power supplies 110 each couple the data wires (i.e., the communication signals MUX, $\overline{\text{MUX}}$) of the communication links 112 together such that a control device on a first communication link 112 coupled to a specific link power supply 110 is operable to communicate with a control device on a second communication link 112 of the specific link power supply 110.

The control devices on the device communication links 112 draw current from the link power supplies 110 through the second wires of the device communication links to charge internal power supplies. The current drawn by each of the control devices on the device communication links 112 returns to the bus power supplies via the first wire of each device communication link. Because the first and second wires are characterized by a resistance per length, voltage drops are produced across each of the first and second wires when the control devices are drawing current from the link power supplies 110. These voltage drops affect the differential communication signals transmitted on the third and fourth wires of the device communication links 112. Since the differential communication signals of the third and fourth wires are referenced to the common connection (i.e., the first wire), the magnitudes of the differential communication signals with respect to the common connection may change in magnitude in response to a current drawn through and a voltage drop produced across the first wire. According to the RS-485 standard, the magnitudes of the differential communication signals (with respect to the common connection) must be maintained within predetermined limits (e.g., between −8 and +12 volts). Accordingly, the total length of the segments of the device communication links 112 connected to each link power supply 110 is limited to a predetermined total length, e.g., approximately 2000 feet.

The link power supplies 110 are further coupled together via a repeater communication link 120, e.g., preferably a three-wire RS-485 communication link. Each link power supply 110 is operable to be coupled to the repeater communication link 120 via a repeater communication link connector J2 (i.e. a communication port). The repeater communication link 120 preferably comprises only three wires: a first wire for a common connection, and second and third wires (i.e., data wires) for carrying the digital messages between the link power supplies 110 (i.e., differential communication signals according to the RS-485 protocol). Preferably, the repeater communication link 120 is not used to provide power to any control devices and an insignificant amount of current (e.g., less than approximately 3 mA) is drawn through the common connection (i.e., the first wire of the repeater communication link 120). Accordingly, the magnitudes of the differential communication signals with respect to the common connection are easily maintained within the limits determined by the RS-485 standard.

According to the present invention, the control devices that are coupled to a first link power supply 110 are operable to communicate with the control devices that are coupled to any of the link power supplies. The link power supplies 110 include integral repeater circuits and operate as repeater devices, i.e., to retransmit the digital messages received via the device communication link 112 on the repeater communication link 120 (and vice versa). The digital messages transmitted on the repeater communication link 120 are essentially identical to the digital messages transmitted on the device communication links 112.

Because the link power supplies 110 are all coupled together via the repeater communication link 120, a maximum of two link power supplies 110 are located between any two control devices in the load control system 100. According to the protocol of the device communication links 112 and a repeater communication link 120, the control devices must wait for a predetermined amount of time after the end of a digital message before transmitting another digital message. The predetermined amount of time is sized to be at least two byte-times (for example, approximately 528 μsec) based on the fact that two link power supplies 110 are located between any two devices.

The digital messages are transmitted on the device communication links 112 and the repeater communication link 120 at a baud rate of preferably 41,666 bits per second. The control devices and the link power supplies 110 may be wired to the device communication links 112 and the repeater communication link 120 using a free-wiring topology, i.e., there is no requirement to wire the control devices in a daisy-chain fashion. Preferably, the repeater communication link 120 may comprise up to a maximum of approximately 2000 feet of wiring. Further, the device communication links 112 connected to a single link power supply 110 may also comprise up to a maximum of approximately 2000 feet of wiring (total between the communication links 112 connected to the single link power supply 110). Thus, there may be up to a maximum of approximately 6000 feet between any two control devices in the load control system 100.

Figure 3:
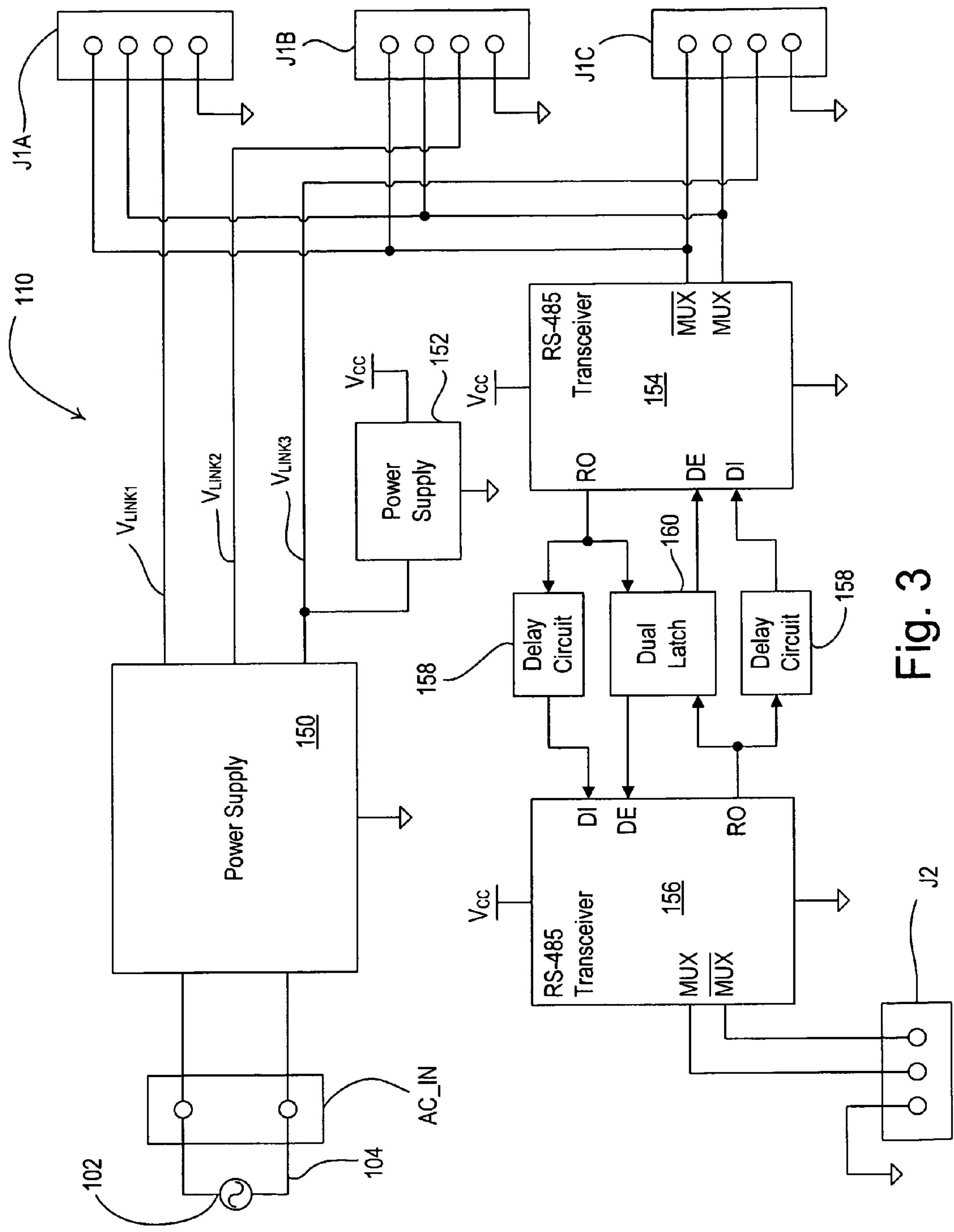
FIG. 3 is a simplified block diagram of a link power supply of the load control system of FIG. 2.

FIG. 3 is a simplified block diagram of the link power supply 110. The link power supply 110 comprises a first power supply 150, which is coupled to the AC power source 102 via the connector AC_IN. The first power supply 150 generates a plurality of DC link voltages $V_{LINK1}$, $V_{LINK2}$, $V_{LINK3}$ (e.g., each 24 volts) for powering the control devices on each of the device communication links 112 that are coupled to the link power supply via the connectors J1A, J1B, J1C, respectively. While the link power supply 110 is operable to be coupled to three device communication links 112 as shown in FIG. 3, the link power supply 110 could include more (or less) device communication link connectors and the power supply 150 could more (or less) link voltages, such that the link power supply could be connected to more (or less) device communication links. The link power supply 110 further comprises a second power supply 152 for generating a DC voltage $V_{CC}$ (e.g., 5 volts) for powering the low-voltage circuitry of the link power supply.

The link power supply 110 also comprises first and second communication circuits, e.g., first and second RS-485 transceivers 154, 156. The first and second RS-485 transceivers 154, 156 preferably each comprise an integrated circuit (IC), e.g., part number MAX3085 manufactured by MAXIM Integrated Products. The first RS-485 transceiver 154 is coupled to the data wires MUX, $\overline{\text{MUX}}$ of each of the device communication links 112 via the device communication link connectors J1A, J1B, J1C. Accordingly, the RS-485 tranceivers of the control devices on each of the device communication links 112 that are connected to a single link power supply 110 are coupled together, such that the control devices are operable to communicate with each other. The second RS-485 transceiver 156 is coupled to the data wires MUX, $\overline{\text{MUX}}$ of the repeater communication link 120 via the repeater communication link connector J2.

The RS-485 transceivers 154, 156 are coupled together via two delay circuits 158 and a dual latch circuit 160. The first RS-485 transceiver 154 receives a digital message via one of the device communication links 112 and provides the digital message to the second RS-485 transceiver 156, which retransmits the digital message on the repeater communication link 120 (and vice versa). The RS-485 transceivers 154, 156 each comprise a data input pin DI for receiving the digital message from the other RS-485 transceiver, and a data output pin RO for transmitting the digital message to the other RS-485 transceiver. Each of the RS-485 transceivers 154, 156 further comprises an active-high transmit-enable pin DE, which must be at a "logic one", i.e., substantially the DC voltage $V_{CC}$, to enable the RS-485 transceiver to transmit a digital message on the connected communication link. The operation and interactions of the delay circuits 158 and the dual latch circuit 160 are described below in the situation in which the first RS-485 transceiver 154 receives a digital message from one of the device communication links 112 and the second RS-485 transceiver 156 transmits the digital message on the repeater communication link 120. However, the process also works in the reverse direction.

The dual latch circuit 160 is coupled to the data output pin RO of the receiving RS-485 transceiver 154 and the transmit-enable pin DE of the transmitting RS-485 transceiver 156. The dual latch circuit 160 is operable to control when the second RS-485 transceiver 156 is enabled to transmit, in response to the digital message received by the first RS-485 transceiver 154. Preferably, each digital message transmitted comprises a start bit of zero. Thus, whenever the first RS-485 transceiver 154 receives a digital message, the data output pin RO transitions from high-to-low at the beginning of the start bit. The output of the dual latch circuit 160 provided to the transmit-enable pin DI of the second RS-485 transceiver 156 is then pulled high, enabling the second RS-485 transceiver 156 to transmit.

The data output pin RO of the receiving RS-485 transceiver 154 is also coupled to the first delay circuit 158. The delay circuit 158 provides a delayed version of the digital message received from the receiving RS-485 transceiver 154 to the data input pin DI of the transmitting RS-485 transceiver 156. The delay circuit 158 provides, for example, 2-3 μsec of delay to ensure that the transmit-enable pin DE of the transmitting RS-485 transceiver 156 is high before the digital message is provided to the data input pin DI. Preferably, the dual latch circuit 160 maintains the transmit-enable pin DE high for a period of time after the end of the digital message provided to the data input pin DI of the transmitting RS-485 transceiver 156.

Figure 4A:
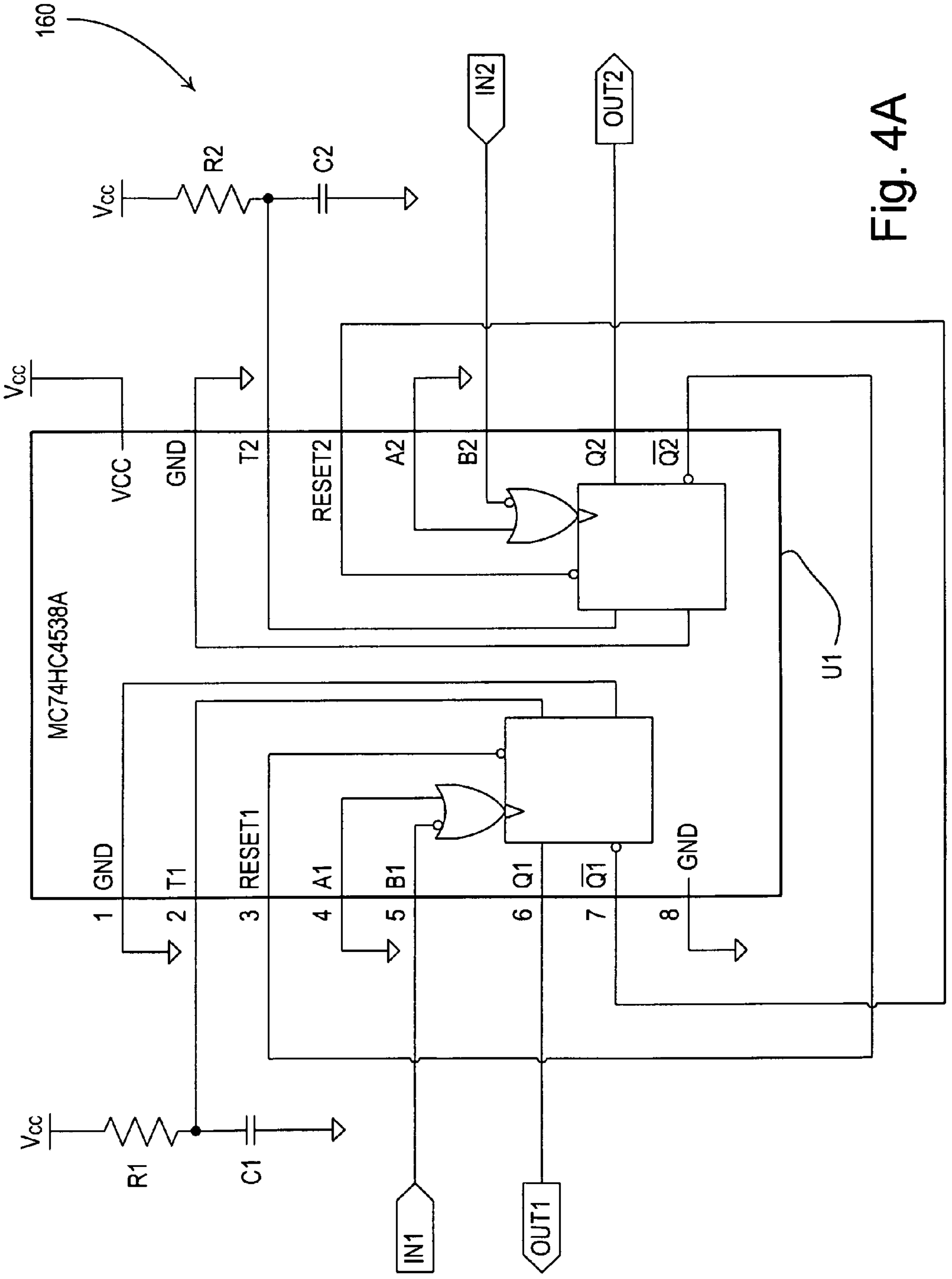
FIG. 4A is a simplified schematic diagram of a dual latch circuit of the link power supply of FIG. 3.

FIG. 4A is a simplified schematic diagram of the dual latch circuit 160. The dual latch circuit 160 preferably comprises a dual latch IC U1, e.g., a dual precision monostable multivibrator part number MC74HC4583A, manufactured by On Semiconductor. The first input IN1 from the data output pin RO of the receiving RS-485 transceiver 154 is coupled to the negative-edge trigger input B1 of the dual latch IC U1. The non-inverting output Q1 of the dual latch IC U1 is provided to the transmit-enable pin DE of the transmitting RS-485 transceiver 156 via the first output OUT1 and is driven high in response to a high-to-low transition on the negative-edge trigger input B1.

An RC-circuit, comprising a resistor R1 and a capacitor C1, is coupled between the DC voltage $V_{CC}$ and circuit common, with the junction of the resistor R1 and the capacitor C1 coupled to the timing input T1 of the dual latch IC U1. The values of the resistor R1 and the capacitor C1 determine the amount of time after the last high-to-low transition of the negative-edge trigger input B1 until the non-inverting output Q1 is driven low. Preferably, the resistor R1 has a resistance of approximately 44.2 kΩ and the capacitor has a capacitance of approximately 0.01 μF, such that the non-inverting output Q1 is held high for at least one byte-time, e.g., approximately 264 μsec, after the last high-to-low transition of the trigger input B1.

Similarly, the second input IN2 from the data output pin RO of the second RS-485 transceiver 156 is coupled to the second negative-edge trigger input B2 of the dual latch IC U1 and the second non-inverted output Q2 is provided to the transmit-enable pin DE of the first RS-485 transceiver 154 via the second output OUT2. The resistance of a resistor R2 and the capacitance of a capacitor C2 determine the amount of time that second non-inverting output Q2 is maintained high after the last low-to-high transition of the second negative-edge trigger input B2, and preferably have values of 44.2 kΩ and 0.01 μF, respectively. The inverting outputs $\overline{Q1}$, $\overline{Q2}$ of the dual latch IC U1 are coupled to the active-low reset inputs RESET2, RESET1, respectively, such that the only one of the RS-485 transceivers 154, 156 is enabled to transmit at any given time.

Figure 4B:
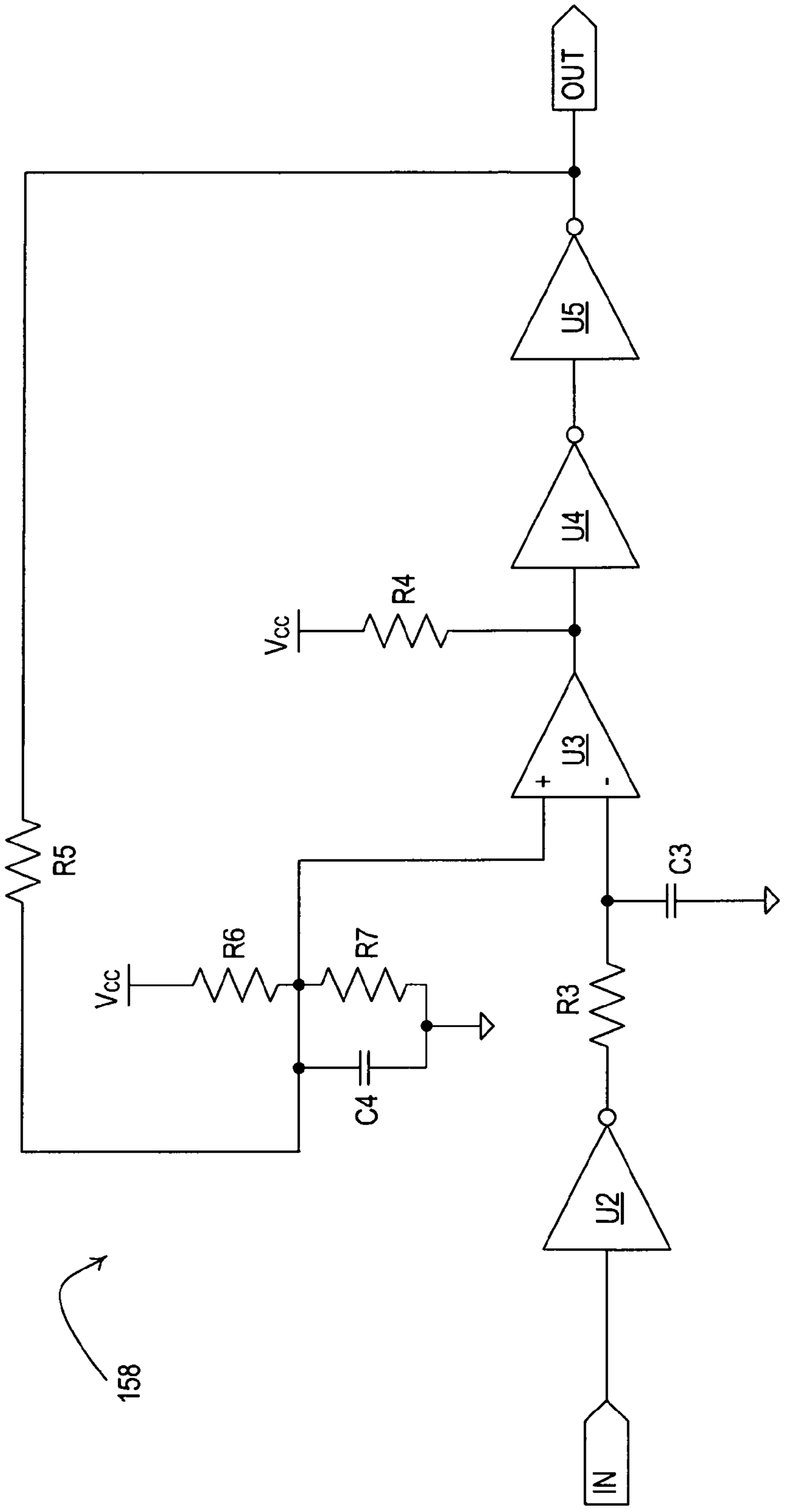
FIG. 4B is a simplified schematic diagram of a delay circuit of the link power supply of FIG. 3.

FIG. 4B is a simplified schematic diagram of the delay circuit 158. The input IN, i.e., from the data output pin RO of the receiving RS-485 transceiver 154, is provided to an inverter U2, e.g., part number MC74VHC1GU04, manufactured by On Semiconductor. The output of the inverter U2 is provided to an RC-circuit, comprising a resistor R3 having a resistance of preferably 3.48 kΩ and a capacitor C3 having a capacitance of preferably 560 pF. The junction of the resistor R3 and the capacitor C3 are provided to a negative input of a comparator U3, e.g., part number LT1716, manufactured by Linear Technology. The output of the comparator U3 is pulled up to the DC voltage $V_{CC}$ by a resistor R4, preferably having a resistance of 1 kΩ. The output of the comparator U3 is provided to two series-connected inverters U4, U5, e.g., both part number MC74VHC1GU04, manufactured by On Semiconductor. The output of the inverter U5 is provided as feedback to the positive input of the comparator U3 through a resistor R5, which preferably has a resistance of 24 kΩ. The positive input of the comparator U3 is pulled up to the DC voltage $V_{CC}$ through a resistor R6, preferably having a resistance of 21.5 kΩ. The positive input of the comparator U3 is further pulled down to circuit common through the parallel combination of a capacitor C4 having a capacitance of preferably 22 pF and a resistor R7 having a resistance of preferably 21.5 kΩ. The output of the inverter U5 is provided as the output OUT to the data input pin DI of the transmitting RS-485 transceiver 156.

Figure 5:
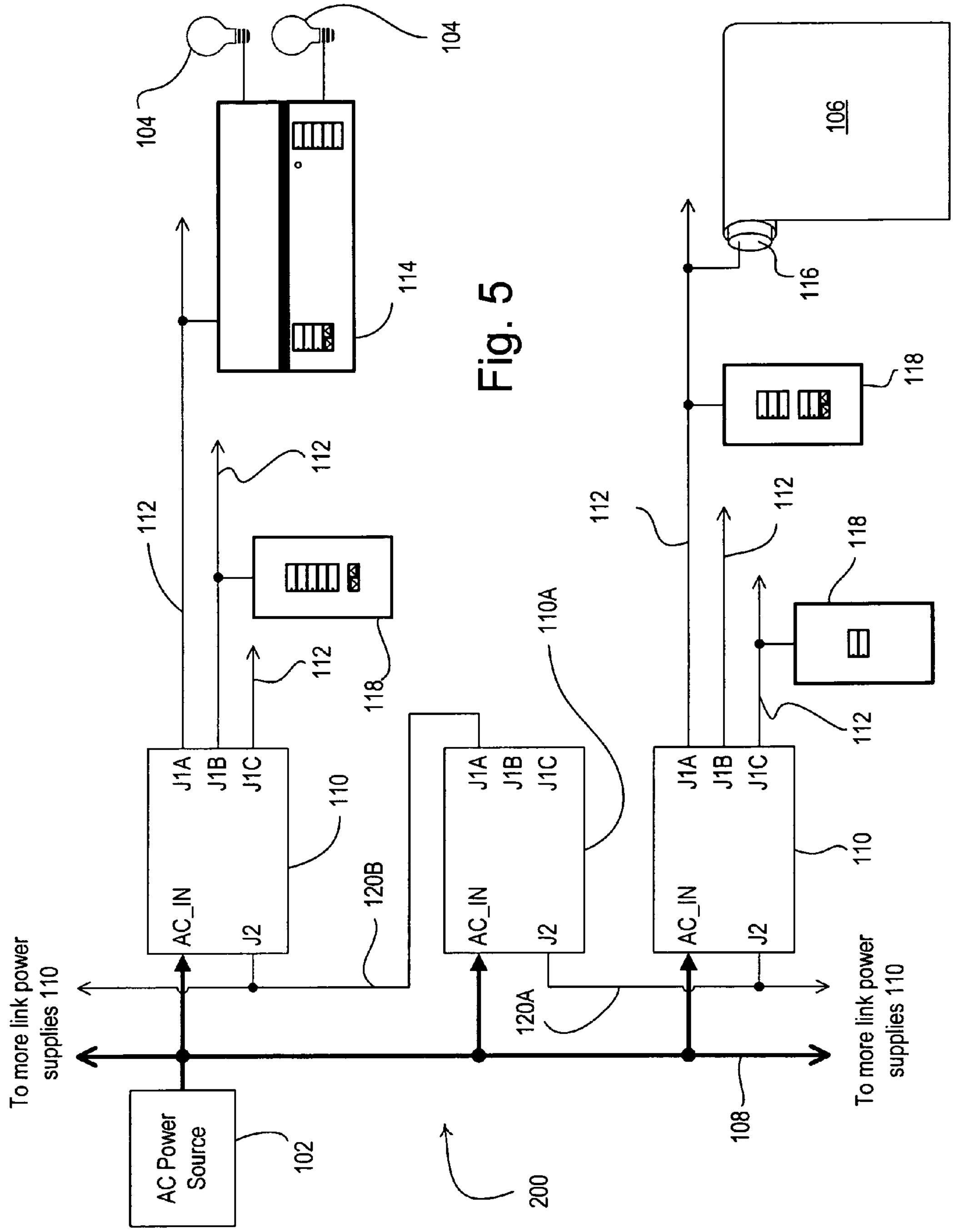
FIG. 5 is a simplified block diagram of a load control system according to a second embodiment of the present invention.

FIG. 5 is a simplified block diagram of a load control system 200 according to a second embodiment of the present invention. The load control system 200 comprises a connecting link power supply 110A, which operates solely as a repeater device. The connector J2 of the connecting link power supply 110A is coupled to a first repeater communication link 120A and the connector J1A of the connecting link power supply 110A is coupled to a second repeater communication link 120B. No control devices are coupled to or receive power through either of the first and second repeater communication links 120A, 120B. Since both the first and second repeater communication links 120A, 120B can be up to approximately 2000 feet long, there may be up to a maximum of approximately 8000 feet between any two control devices in the load control system 200. Accordingly, there may be a maximum of three link power supplies 110 between any two control devices in the load control system 200. Each of the control devices and link power supplies 110, 110A must wait for a predetermined amount of time, for example, at least two byte-times (i.e., approximately 528 μsec), after the end of a digital message before transmitting another digital message. Alternatively, the present invention may be used in load control system having more than three link power supplies between any two control devices in the load control system.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A load control system for controlling the amount of power delivered to a plurality of electrical loads from an AC power source, the system comprising:

a plurality of link power supply devices, each link power supply device including first and second communication ports, and an internal power supply for receiving a supply voltage and for generating a link voltage;

a plurality of device communication links, each coupled to the first communication port of one of the plurality of link power supply devices;

a plurality of control devices, each coupled to one of the plurality of device communication links, the link voltages of the link power supplies provided on the device communication links, such that the control devices are operable to draw current from the link power supply devices, the control devices operable to transmit and receive first digital messages between each other via the device communication links; and a repeater communication link coupled to the second communication port of each of the link power supply devices, the link power supply devices each operable to receive the first digital messages via the first communication port and to subsequently transmit second digital messages on the repeater communication link via the second communication port, the second digital messages substantially the same as the first digital messages;

wherein no control devices are coupled to the repeater communication link, such that no control devices draw current through the repeater communication link.

2. The load control system of claim 1, wherein the repeater communication link comprises a first wire for a common connection, and second and third wires for transmitting the second digital messages between the link power supply devices.

3. The load control system of claim 2, wherein each device communication link comprises a first wire for a common connection, a second wire for supplying the link voltage to the control devices, and third and fourth wires for transmitting the first digital messages between the control devices.

4. The load control system of claim 3, wherein the second and third wires of the repeater communication link, and the third and fourth wires of the device communication links are adapted to carry differential communication signals referenced to the respective first wires.

5. The load control system of claim 4, wherein the repeater communication link and the device communication links comprise RS-485 communication links.

6. The load control system of claim 1, wherein the control devices each wait for a predetermined amount of time after receiving the first digital messages on the device communication links before transmitting new digital messages on the digital communication links.

7. The load control system of claim 6, wherein the predetermined amount of time comprises at least approximately two byte-times.

8. The load control system of claim 1, wherein the lengths of each of the repeater communication link and the device communication links are limited by a predetermined total length.

9. The load control system of claim 8, wherein the predetermined total length comprises approximately 2000 feet.

10. The load control system of claim 1, wherein the repeater communication link comprises first and second portions;

the system further comprising:

an additional link power supply device having a first communication port coupled the first portion of the repeater communication link and a second communication port coupled to the second portion of the repeater communication link, such that the additional link power supply device is operable to retransmit on the second portion of the repeater communication link the second digital messages that are received on the first portion of the repeater communication link.

11. A link power supply device for a load control system for controlling the amount of power delivered to a plurality of electrical loads from an AC power source, the link power supply device comprising:

a first communication port adapted to be coupled to a device communication link for receipt of a first digital message;

a second communication port adapted to be coupled to a repeater communication;

first and second communication circuits coupled to the first and second communication ports, respectively, the first and second communication ports operatively coupled together, such that the second communication circuit is operable to transmit a second digital message on the repeater communication link after the first communication circuit receives the first digital message; and a power supply operable to receive a supply voltage and to generate a link voltage, the link voltage provided to the first communication port, but not provided to the second communication port.

12. The link power supply device of claim 11, further comprising:

a latch circuit coupled between the first and second communication circuits, the latch circuit operable to control when the second communication circuit is operable to transmit in response to the first digital message received by the first communication circuit; and a delay circuit coupled between the first and second communication circuits, the delay circuit operable to provide a delayed version of the first digital message received by the first communication circuit to the second communication circuit.

13. The link power supply device of claim 11, wherein the first communication port comprises four terminals and the second communication circuit comprises three terminals.

14. The link power supply device of claim 11, wherein the first and second communication circuits comprise RS-485 transceiver ICs.

15. The link power supply device of claim 11, further comprising:

a plurality of first communication ports each coupled to the first communication circuit, the link voltage provided to each of the first communication ports.

16. A load control system for controlling the amount of power delivered to a plurality of electrical loads from an AC power source, the system comprising:

a plurality of link power supply devices, each link power supply device including first and second communication ports, and an internal power supply for receiving a supply voltage and for generating a link voltage;

a plurality of device communication links, each coupled to the first communication port of one of the plurality of link power supply devices; and a plurality of control devices, each coupled to one of the plurality of device communication links, the link voltages of the link power supplies provided on the device communication links, such that the control devices are operable to draw current from the link power supply devices, the control devices operable to transmit and receive first digital messages between each other via the device communication links;

wherein the improvement comprises:

a repeater communication link coupled to the second communication port of each of the link power supply devices, the link power supply devices each operable to receive the first digital messages via the first communication port and to subsequently transmit second digital messages on the repeater communication link via the second communication port, the second digital messages substantially the same as the first digital messages;

wherein no control devices are coupled to the repeater communication link, such that no control devices draw current through the repeater communication link.

* * * * *